UNITED STATES PATENT OFFICE.

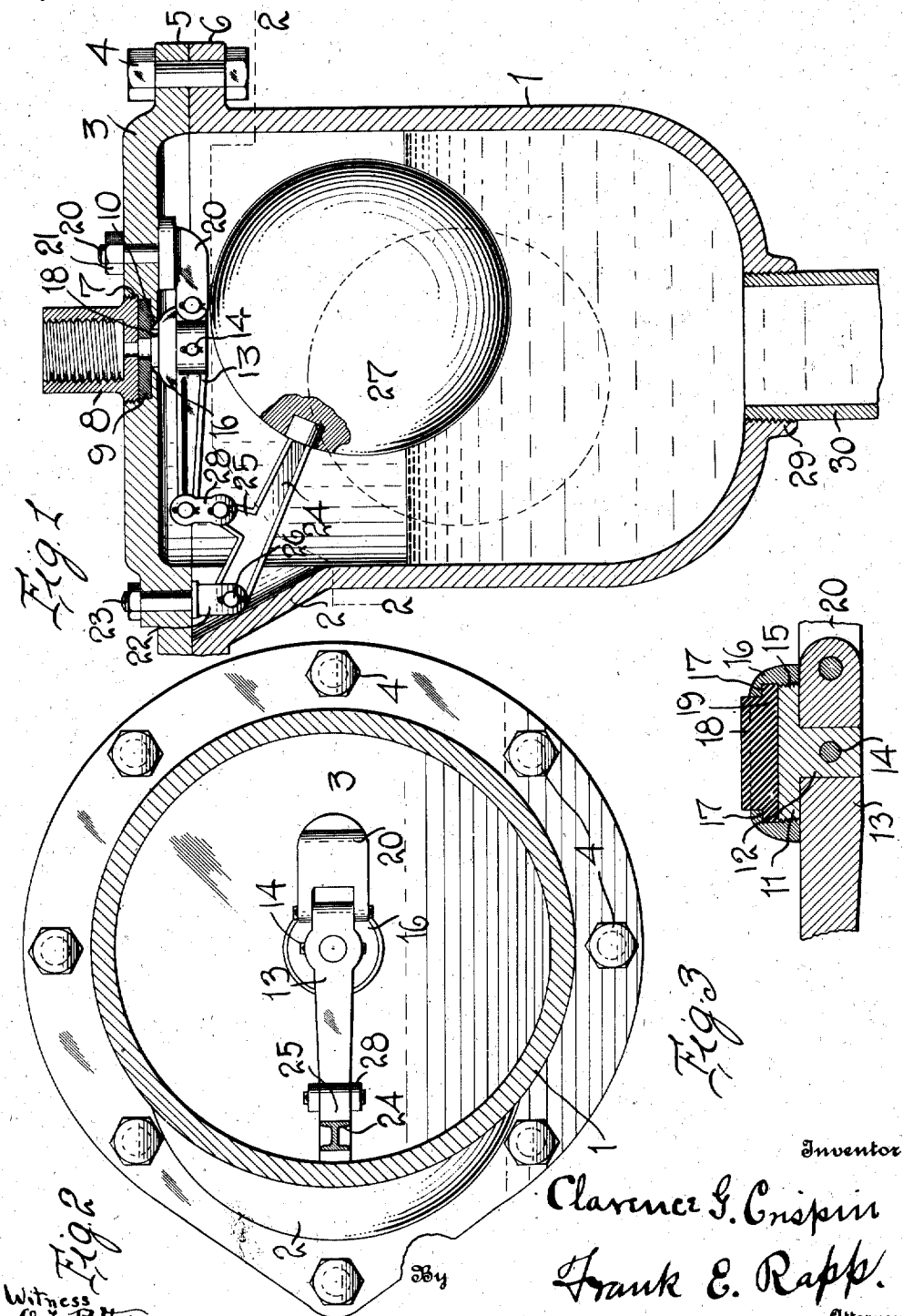

CLARENCE G. CRISPIN, OF SALEM TOWNSHIP, LUZERNE COUNTY, PENNSYLVANIA.

PRESSURE-VALVE.

1,244,177. Specification of Letters Patent. Patented Oct. 23, 1917.

Application filed May 15, 1915. Serial No. 28,300.

*To all whom it may concern:*

Be it known that I, CLARENCE G. CRISPIN, a citizen of the United States, residing in the township of Salem, in the county of Luzerne and State of Pennsylvania, have invented certain new and useful Improvements in Pressure-Valves, of which the following is a specification.

My invention relates to improvements in that class of valves especially applicable to or serviceable in connection with water mains or pipes.

The object of my invention is to provide a device for venting such water mains or pipes, or the releasing of confined air when admitting water thereto, and for the admission of air when the water is withdrawn from the pipes or valve chamber, and to carry out these ends in a simple and effective manner.

Furthermore, the object of my invention is to provide a valve operated by a float through the medium of levers connected to the valve and being attached to a receptacle or chamber, in which the valve operates.

Finally, the object of my invention is to provide a simple and effective air releasing means for a water system, having a removable lever supporting the entire mechanism, and consists in an improved, novel, and useful device; said invention consisting of certain structural features substantially as hereinafter more fully disclosed and particularly pointed out by the claims.

In describing the invention in detail, reference will be had to the accompanying drawing, forming a part of this specification, and in which corresponding parts in the several views are indicated by similar reference characters, and in which:

Figure 1 is a vertical central section of the valve showing its interior construction.

Fig. 2 is a section on the line 2—2 of Fig. 1.

Fig. 3 is a vertical section showing the valve construction.

In the drawing, 1 indicates a valve chamber, provided with an enlarged portion, 2, formed at its open end. The chamber 1 is provided with a removable cover, 3, which is secured in position on the chamber by a suitable number of bolts, 4, passing through flanges, 5, and 6, formed integrally on the valve chamber and cover. The cover, 3, supports my improved valve operating mechanism and has a central cavity, 7, which is provided with screw threads adapted to engage the thread of a bushing, 8. I seat in the cavity a disk, 9, of hard rubber which is provided with a central aperture. A similar aperture also extends through the cover, approximately in the center of the cavity, which is provided with a beveled edge, 10, upon the inner surface, forming a seat for a valve. The valve as shown in Fig. 3, comprises a disk, 11, having a stud, 12, formed integrally therewith, which extends through an aperture in a lever, 13. The stud is secured to the lever by means of a pin, 14. The edge of the disk, 11, I provide with screw threads, 15, upon which a collar, 16, is threaded; the collar having a reduced end portion forming shoulders, 17. A rubber disk, 18, having an extension, 19, is secured on the disk, 11, by the collar, 16. A stud, 20, is secured to the cover by a bolt, 21, formed integrally therewith, and to the outer end of the stud, 20, I pivotedly secure a lever, 13, at one end; it being understood that this lever supports the valve, the construction of which has hereinbefore been described. I also secure a lug, 22, by means of a bolt, 23, to the cover in the off-set formed by the enlarged portion of the chamber. A lever, 24, provided with a projection, 25, is pivotedly connected by means of a pin, 26, to the lug, 22. On the outer end of the lever, 24, a float ball, 27, is secured. A link, 28, connects one end of the lever, 13, with the projection, 25, formed on the lever, 24. I also provide the valve chamber with a threaded aperture, 29, adapted to receive the threaded end of the pipe, 30.

In the operation of my improved air valve, the water enters the receptacle and raises the float, 27, causing the valve to be raised and seated against the disk, 9, thereby preventing water from escaping through the aperture in said disk. The air entering through the pipe, 30, will accumulate in the upper portion of the receptacle and will gradually displace and force the water back into the system from the chamber, and as the water is forced back the float falls toward the position indicated in dotted lines, thus opening the valve. As the air is permitted to escape, the water rushes back into the chamber, which again raises the float and shuts and closes the valve. Arrangement of levers for operating the valve is thus provided wherein is attained at once, and in a very limited space, a force sufficiently powerful to open the valve against heavy air pressure, and yet sufficiently powerful to maintain the valve tightly closed to prevent the water from being forced through the chamber.

The construction of the valve is plainly illustrated in Fig. 3, it being noted that when the rubber valve seat, 8, is worn out and it is desired to replace the worn out seat by a new one, the collar, 16, is threaded off the valve disk, when the rubber disk may be removed. In this construction the retaining screw, by which it is customary to secure the rubber to a valve seat, is not required, and a simple and durable construction is provided.

It is believed that from the foregoing description of the construction and operation of my improved valve, the arrangements and combination will be fully understood, it being noted that changes may be made in the proportion and details of the construction without departing from the scope of my invention.

Having fully described my invention, what I claim as new and desire to secure by Letters Patent is:

In a pressure valve for water systems, a receptacle having an enlarged portion, and an inlet for water under pressure in the bottom thereof, a removable cover, said cover having a central opening provided with a cut-away portion forming a valve seat, a lever pivotally supported by said cover, a valve carried by said lever and adapted to seat in said cut-away portion, a second lever pivotally secured to the cover and occupying said enlarged portion and provided with a float at its outer end, and means for connecting said levers whereby the valve is opened or closed by the movement of the float substantially as described.

In testimony whereof I affix my signature in presence of two witnesses.

CLARENCE G. CRISPIN.

Witnesses:
 ROBERT A. CARSE,
 F. M. WALTON.